(12) United States Patent
Smith

(10) Patent No.: US 6,394,875 B1
(45) Date of Patent: May 28, 2002

(54) BICYCLE MOUNTED NOISE-MAKING DEVICE

(76) Inventor: Terry Smith, 420 W. Sixth St., Tustin, CA (US) 92780

(*) Notice: Subject to any disclaimer, the term of this patent is extended or adjusted under 35 U.S.C. 154(b) by 0 days.

(21) Appl. No.: 09/538,929

(22) Filed: Mar. 31, 2000

(51) Int. Cl.[7] .................................................. A63H 5/00
(52) U.S. Cl. ...................... 446/404; 446/397; 280/288.4
(58) Field of Search .................................. 446/404, 397, 446/421, 420, 418, 405, 409, 413; 280/828, 1.14, 288.4

(56) References Cited

U.S. PATENT DOCUMENTS

| | | | | |
|---|---|---|---|---|
| 2,367,430 A | * | 1/1945 | Redlund | 280/288.4 |
| 2,603,035 A | * | 7/1952 | Countryman et al. | 446/404 |
| 2,620,764 A | * | 12/1952 | Cook | 280/288.4 |
| 2,719,385 A | * | 10/1955 | Wilson | 280/288.21 |
| 2,987,850 A | * | 6/1961 | Bergland | 280/288.4 |
| 3,003,280 A | * | 10/1961 | Gordon | 280/288.4 |
| 3,071,894 A | * | 1/1963 | Frye | 280/288.4 |
| 3,097,447 A | * | 7/1963 | Peham et al. | 280/288.4 |
| 3,121,293 A | * | 2/1964 | Sperry et al. | 446/404 |
| 3,267,606 A | * | 8/1966 | Forbis et al. | 280/288.21 |
| 3,289,348 A | * | 12/1966 | Terry | 289/288.4 |
| 3,559,333 A | * | 2/1971 | Manzo | 446/404 |
| 3,754,350 A | * | 8/1973 | Gorke | 446/404 |
| 3,905,151 A | * | 9/1975 | Zweigle | 446/404 |
| 4,151,677 A | * | 5/1979 | Tucker | 446/404 |
| 4,735,592 A | * | 4/1988 | Griffin | 446/404 |
| 4,875,885 A | * | 10/1989 | Johnson | 446/404 |
| 5,306,197 A | * | 4/1994 | Watanabe | 446/409 |
| 5,314,372 A | * | 5/1994 | Kramer | 446/404 |
| 5,367,939 A | * | 11/1994 | Barker | 446/421 |
| 5,611,558 A | * | 3/1997 | Randmae | 446/404 |

* cited by examiner

*Primary Examiner*—Jacob K. Ackun, Jr.
*Assistant Examiner*—Urszula M. Cegielnik
(74) *Attorney, Agent, or Firm*—Steins & Associates, P.C.

(57) ABSTRACT

A sound-making device for attachment to bicycle wheels is presented which includes a flared, horn-shaped tube, a flexible contact member and a universal mounting device for connecting the invention to a bicycle. The horn-shaped tube is specifically designed to eliminate destructive interference of sound waves generated by the flexible contact. The flexible contact is designed to be easily replaceable, even by a child.

6 Claims, 3 Drawing Sheets

BICYCLE MOUNTED NOISE-MAKING DEVICE

BACKGROUND OF THE INVENTION

1. Field of the Invention

This invention is a device for children's bicycles which resembles a motorcycle exhaust pipe in appearance and imitates or emulates the sound of a motorcycle engine.

2. Brief Summary of the Prior Art

There are several known devices for emulating the sound of a combustion engine, including U.S. Pat. Nos. 2,620,764, 3,210,889, and 3,439,926. These devices propose constructions with side plates having a plastic finger/contact mount on them. The whole plate is usually mounted on the bicycle frame directly and the plastic contact interferes with the travel of the bicycle wheel spokes to make the repetitive noise vibrations. These device did not concentrate or direct the noise created by the vibrating contact and allowed said noise vibrations to dissipate into the surrounding air.

More recently, U.S. Pat. No. 4,151,677 by Tucker (May 1, 1979) teaches an adjustable noisemaker with contact arms of varying length, thickness and width. The arms can be selected by the user to determine the kind and volume of noise produced. The body of the noisemaker is a fanciful design, resembling a jet engine housing; the body has no perceptible acoustic function. Contact arms cannot be replaced U.S. Pat. No. 4,737,592 by Griffin (Apr. 5, 1988) proposes a conical hollow member attached to the frame of the bicycle, which conical member retains a vibrating arm inserted into the spokes of the bicycle. The conical member concentrates, directs, and amplifies the sound vibrations from the contact arm.

Each of the two most-recently patented devices can be attached to the horizontal bicycle frame in any conventional manner.

SUMMARY OF THE INVENTION

This noise-making device (hereafter "bike pipe") is shaped like the exhaust tailpipe of a motorcycle. The bike pipe is mounted on the uprising rear wheel support of a child's bicycle frame. When the bicycle is pedaled the bike pipe emits a loud sound similar to that of a running motorcycle engine.

The bike pipe has four (4) basic parts:

1. A hollow horn shaped pipe.
2. A rotatable cap.
3. A replaceable flexible spoke contact.
4. A universal mount that is solidly attached to the pipe.

The bike pipe possesses a universal mount that ensures quick, simple, proper mounting of the device on all children's bicycles, requiring nothing more than a wrench to remove and replace the rear wheel axle nut.

When attached to a bicycle, the pipe extends up and away to the rear of the bicycle. A flexible spoke contact protrudes into the spokes of the rear wheel at a right angle to the direction of travel of the spokes. When the wheel rotates the spokes one by one pick up the flexible contact, carry it to the limit of its travel path and drop it, causing a loud roaring vibration to travel down the length of the pipe and up behind the moving bicycle where it can be easily heard by the child riding the bicycle. The vibrations emanating from the pipe are aimed generally upwards making it difficult to detect once the bicycle has traveled a short distance away.

Previous designs of similar bicycle noise-making devices have set the spoke-engaging member half way down a pipe parallel to the long axis of the pipe. These configurations are inferior to the bike pipe because they broadcast half the vibrations from the spoke contact down and out of the pipe and the other half up to a closed end where they reflect back toward the spoke engaging member. The reflected vibrations have a tendency to destructively interfere with and cancel new vibrations, especially the more desirable lower frequencies.

The bike pipe design with the flexible spoke contact set inside the cap on the forward end of the pipe perpendicular to the long axis of the pipe allows all the vibration to be broadcast down and out of the pipe and eliminates any destructive interference with low-frequency vibration.

The rotating cap and spoke contact are held in place by means of a simple nylock wing nut screwed down on a threaded bolt that runs through the center of each of them on a plane which is parallel to the long axis of the pipe. This assembly is efficient and unique. The flexible spoke contact can be replaced quickly and easily, even by a child. By tightening or loosening the wing nut, the tone of the vibrations can be changed from the low compression tone of a Harley Davidson to the higher smoother pitch of the popular four cylinder Japanese motorcycles. The cap rotates 90 degrees to the left or right depending on which side of the bicycle the device is mounted on, allowing the device to be turned on or off.

The bike pipe design is far superior to the previous art bicycle noisemakers that resemble an exhaust pipe and mimic the sound of an engine. The bike pipe sound is louder to the child riding the bicycle yet barely audible 100 feet away, reducing neighborhood noise pollution. It is much simpler to attach. It can be turned on and off by merely pushing or pulling a lever. Its tone can be adjusted by tightening or loosening a wing nut. The spoke contact is cheap and very easily replaced, even by a child.

An object of the present invention is to provide a simulated motorcycle exhaust pipe device attachable to a child's bicycle that simulates or emulates the sound of a motorcycle engine exhaust. This device will be easily attachable and detachable to/from the bicycle frame.

Another object of this invention is to provide a low-cost spoke-engaging contact member that can be easily replaced, even by a child.

Another object of the invention is to provide an acoustically efficient housing for the device which concentrates the sound made by the device and minimizes internal sonic interference in the housing.

A further object of the invention is to provide a device that will engage the rotating bicycle wheel spokes nearer the hub of the wheel, decreasing stress on the spokes at the rim end or in the middle, preventing the spokes from loosening at the attachments or suffering metal fatigue.

A further object of this invention is to minimize the interference with the pedaling foot of the bicycle rider by permitting placement of the device behind the hub of the rear wheel.

A further object of this invention is to provide a practical mounting device for the invention, suitable for attachment to the frame of any bike with any tube size frame.

A further object of this invention is to make the device such that it can be turned off (disengaged) without dismantling the entire device.

BRIEF DESCRIPTION OF THE DRAWINGS

The drawings provided can be understood by reading the accompanying description for one embodiment of the invention.

DESCRIPTION OF THE PREFERRED EMBODIMENT

Figure 1:
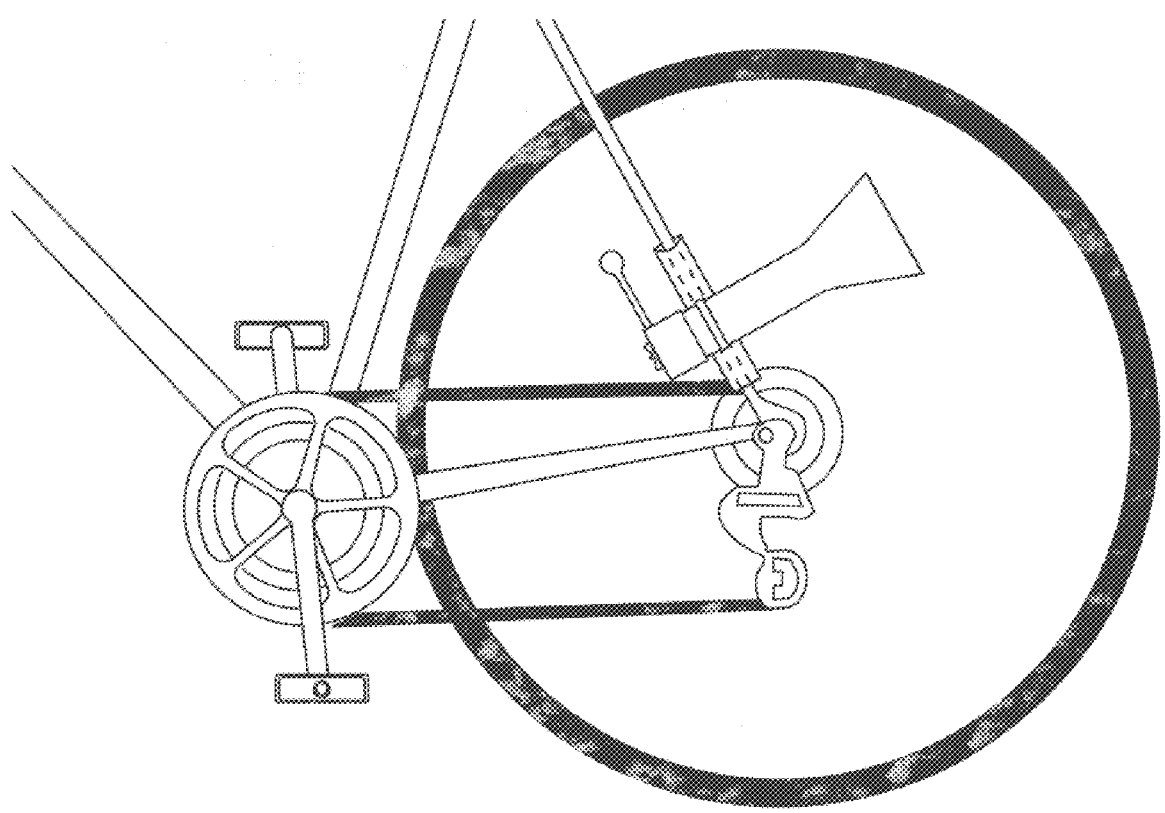
FIG. 1. is a side view of the rear wheel area of a bicycle with the invention attached.
Figure 2:
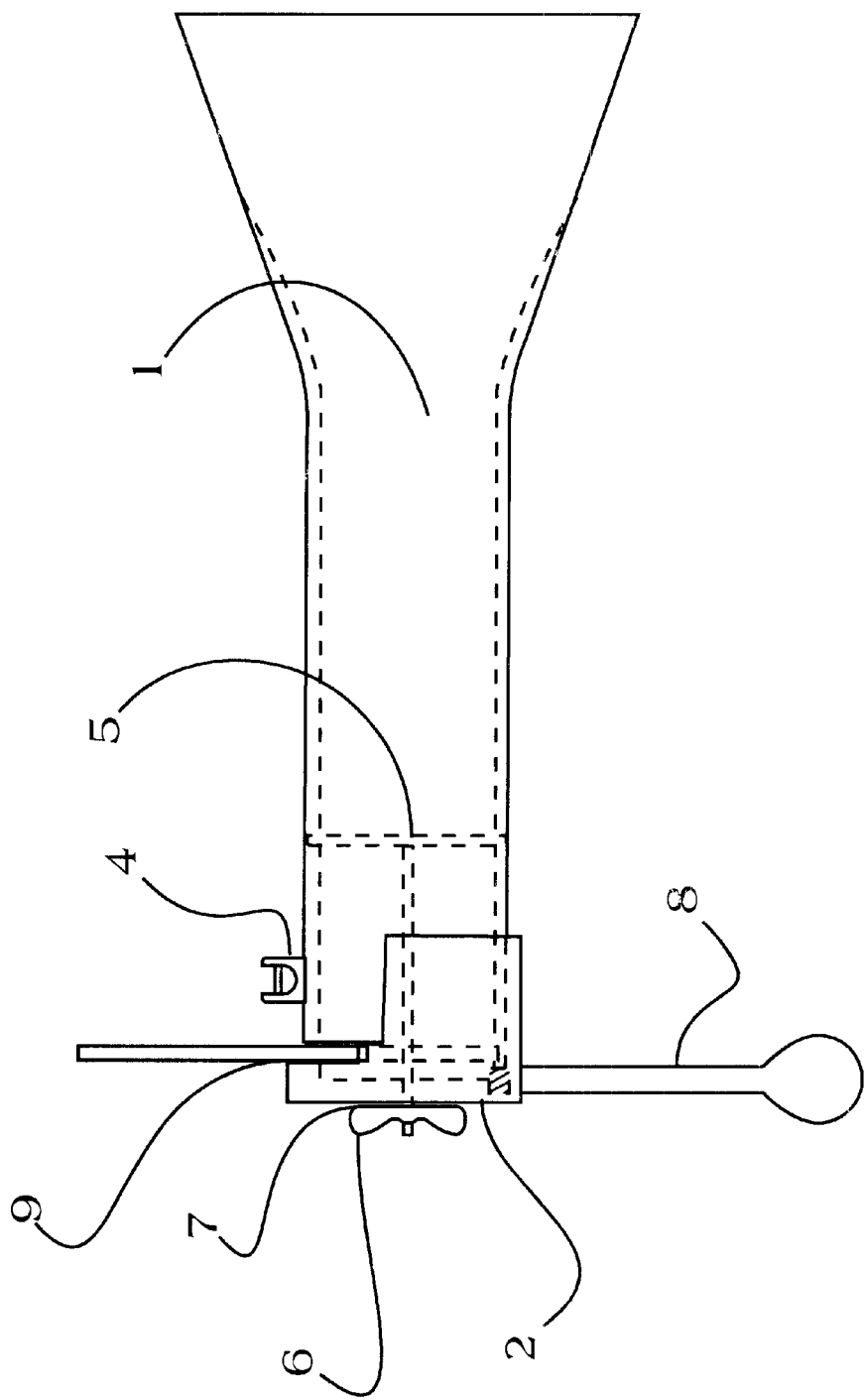
FIG. 2. is cross-section drawing of the device, assembled, showing the main features.

Referring to FIG. 2, the main body of the device is indicated by 1, referred to as the pipe, a hollow, flared tube designed to reduce sonic backwash and interference. The pipe will be made of plastic to minimize cost and weight. Attached to the pipe is the pipe mount, 4, made of metal or plastic, attached to the pipe at the two indicated mounting bracket holes. The narrower end of the pipe is covered with a plastic cap, 2, as shown assembled in FIG. 2 and disassembled in FIG. 3.

Figure 3:
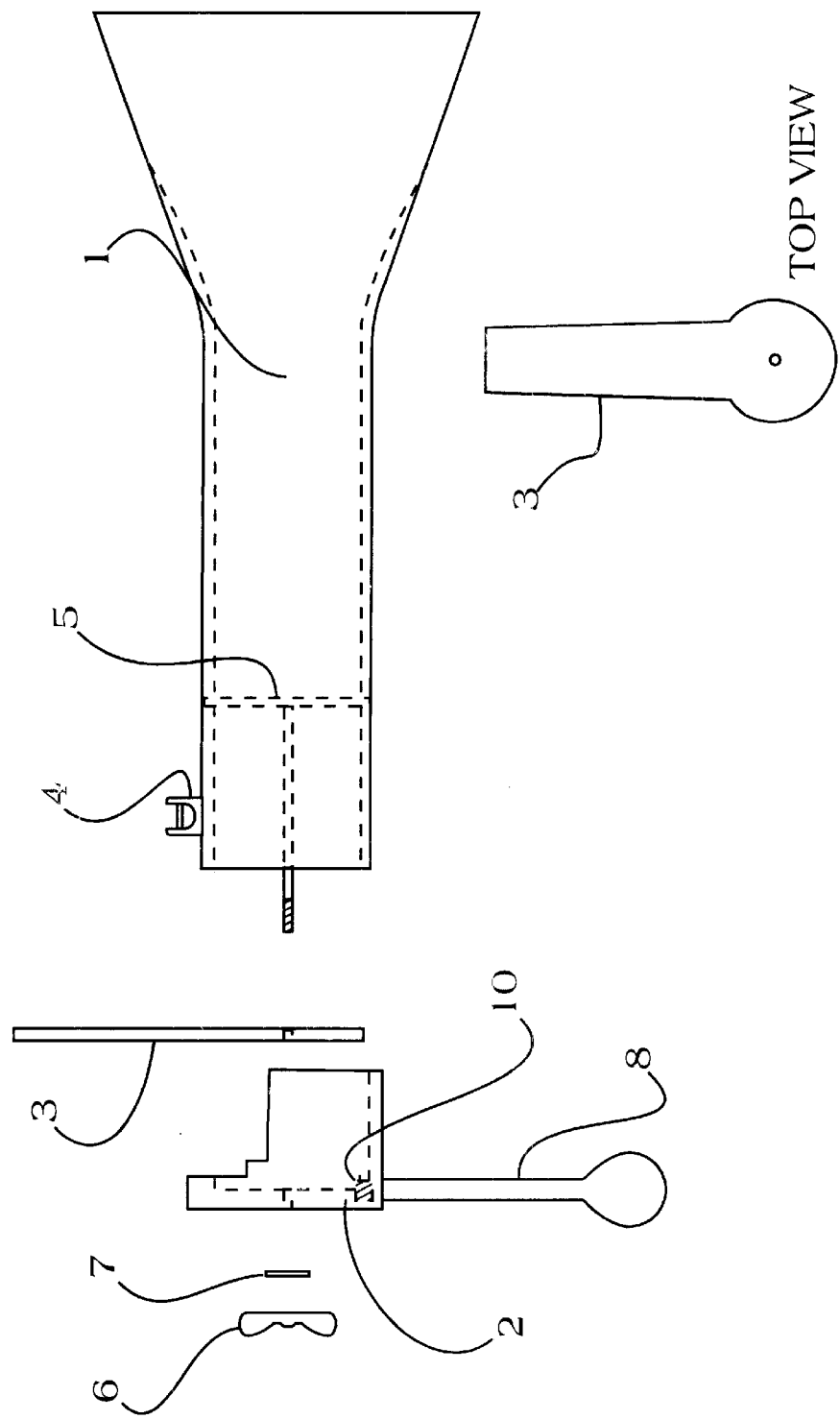
FIG. 3. is a cross-section drawing of the disassembled invention and its components.

The cap to pipe assembly T-bolt (T-bolt), 5, Shown in FIG. 3, is fixedly attached to the interior of the pipe, 1, and the screw-threaded end section of it passes through the center of the contact reed (reed), 3. The cap, 2, fits over the narrow end of the pipe in a sliding fashion, being in interior diameter slightly larger than the outside diameter of the horn, and is fitted over the screw-thread end of the T-bolt, 5.

An opening in the side of the cap permits the reed to extend outside the diameter of the pipe and come into contact with the bicycle spokes. A washer, 7, fits over the screw thread end of the T-bolt after it has passed through the center of the cap, and a wing nut, 6, screwedly engages the T-bolt threaded end and can be tightened down over the washer to hold the cap onto the pipe. An on/off position control handle, 8, is inserted into the side of the cap and permits the cap to be rotated about the center axis of the pipe, turning the reed into or away from the path of the bicycle spokes. An air gap, 9, between cap and reed allows the reed to vibrate against the mouth of the pipe. An inside lip, 10, of the cap forces the reed against the mouth of the pipe.

The pipe is attached to the bicycle frame by means of the mount, 4, which places the cap and reed such that the cap and reed can be rotated by means of the on/off position control handle to bring the reed into contact with the turning spokes of the bicycle wheel. The sound produced by the reed can be moderated or turned off by moving the control handle such that the reed is rotated farther away from the spokes or completely out of the path of the spokes.

The above description was provided to illustrate and not limit this invention. Various modifications obvious to one skilled in the art are within the scope of the claims appended to this specification.

I claim:

1. A noise-making accessory for vehicles defined by at least one spoked wheel, said accessory to be mounted on said vehicle adjacent to the spokes of one of the wheels of said vehicle, and comprising:

a cylindrically-shaped pipe defining an interior having first and second open ends and further defining an axis;

a reed;

a removable cap defined by an inside lip;

a mount bracket attached fixedly to sad pipe;

an on/off position control handle extending from said cap;

a cap to pipe assembly T-bolt, said T-bolt defined by a shaft having a screw-threaded end and an opposing end from which extend a pair of arms;

a washer defined by an aperture;

a wing nut defined by a threaded bore;

wherein said T-bolt is attached fixedly by said to the interior of said pipe at two points on opposite sides of said interior, said screw-threaded end projecting parallel to said axis and extending beyond said first open end, through an aperture formed in said reed, through a central hole formed in said removable cap;

wherein said cap is placed removably over said open end of said pipe such that said screw-thread end of said T-bolt passes through said cap at said hole, whereafter said washer is placed over said end of said T-bolt, and whereafter said wing nut is placed over said screw-threaded end and attached thereto by engagement of said threaded bore with said screw-threaded end, such that said cap can be rotated around the axis of said pipe by grasping said handle and turning;

whereby an air gap is formed between said cap and said reed such that said reed can vibrate against said pipe; and whereby said inside lip cooperates with said reed such that said lip forces said reed against said opening in said pipe when said T-bolt is tightened.

2. The accessory of claim 1, wherein said second open end of said pipe defines a larger opening than said opening defined by said first end, such that said pipe defines a flared shape.

3. The accessory of claim 2 wherein said pipe, said cap, said reed, and said control handle are made of a plastic material.

4. A noise-making device for vehicles defined by spoked wheels and a base frame, said device comprising:

a mount bracket attachable to said vehicle frame;

a pipe extending from said mount bracket, said pipe defining a longitudinal axis, and an interior, said pipe further defining a first and second open end;

a T-bolt defined by a screw-threaded end and an opposing end defined by a pair of opposing arms, said opposing arms attached to opposing sides of said inferior of said pipe, and said screw-threaded end extending outwardly from said first end of said pipe;

a reed defined by an aperture, said screw-threaded end protruding through said aperture;

a cap defined by a control handle extending therefrom and a central hole, said screw-threaded end protruding through said central hole;

a washer defining an aperture formed therethrough, said screw-threaded end protruding trough said aperture; and a nut defining a threaded bore threadedly engaging said screw-threaded end, whereby said washer, cap, reed, T-bolt and pipe are held together as an assembly.

5. The device of claim 4, wherein said second opening in said pipe is larger than said first opening, whereby said pipe defines an outwardly-flaring shape from said first end to said second end.

6. The device of claim 5, wherein said pipe, said cap, said reed and said control handle are made from a plastic material.

* * * * *